United States Patent
Howson et al.

(10) Patent No.: US 11,587,281 B2
(45) Date of Patent: *Feb. 21, 2023

(54) UNIFIED RASTERIZATION AND RAY TRACING RENDERING ENVIRONMENTS

(71) Applicant: Imagination Technologies Limited, Kings Langley (GB)

(72) Inventors: John W. Howson, Kings Langley (GB); Luke Tilman Peterson, San Francisco, CA (US); Steven J. Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,226

(22) Filed: Jan. 11, 2021

(65) Prior Publication Data

US 2021/0134047 A1 May 6, 2021

Related U.S. Application Data

(63) Continuation of application No. 16/248,421, filed on Jan. 15, 2019, now Pat. No. 10,909,745, which is a (Continued)

(51) Int. Cl.
*G06T 15/06* (2011.01)
*G06T 15/80* (2011.01)
(Continued)

(52) U.S. Cl.
CPC ............... *G06T 15/06* (2013.01); *G06T 1/20* (2013.01); *G06T 15/005* (2013.01); *G06T 15/80* (2013.01);
(Continued)

(58) Field of Classification Search
None
See application file for complete search history.

(56) References Cited

U.S. PATENT DOCUMENTS

| | | |
|---|---|---|
| 4,466,061 A | 8/1984 | Desantis et al. |
| 4,625,289 A | 11/1986 | Rockwood |

(Continued)

OTHER PUBLICATIONS

"Razor: An Architecture for Dynamic Multiresolution Ray Tracing" Peter Djeu et. al. University of Texas at Austin Department of Computer Sciences, Technical Report #07-52 Jan. 24, 2007.
(Continued)

*Primary Examiner* — Tize Ma
(74) *Attorney, Agent, or Firm* — Potomac Law Group, PLLC; Vincent M DeLuca

(57) ABSTRACT

A graphics processor architecture provides for scan conversion and ray tracing approaches to visible surface determination as concurrent and separate processes. Surfaces can be identified for shading by scan conversion and ray tracing. Data produced by each can be normalized, so that instances of shaders, being executed on a unified shading computation resource, can shade surfaces originating from both ray tracing and rasterization. Such resource also may execute geometry shaders. The shaders can emit rays to be tested for intersection by the ray tracing process. Such shaders can complete, without waiting for those emitted rays to complete. Where scan conversion operates on tiles of 2-D screen pixels, the ray tracing can be tile aware, and controlled to prioritize testing of rays based on scan conversion status. Ray population can be controlled by feedback to any of scan conversion, and shading.

20 Claims, 10 Drawing Sheets

Related U.S. Application Data continuation of application No. 15/174,811, filed on Jun. 6, 2016, now Pat. No. 10,217,266, which is a continuation of application No. 13/953,754, filed on Jul. 30, 2013, now Pat. No. 9,424,685.

(60) Provisional application No. 61/678,055, filed on Jul. 31, 2012.

(51) Int. Cl.
  *G06T 15/00* (2011.01)
  *G06T 1/20* (2006.01)

(52) U.S. Cl.
  CPC ...... *G06T 2200/04* (2013.01); *G06T 2200/28* (2013.01); *G06T 2207/20021* (2013.01)

(56) References Cited

U.S. PATENT DOCUMENTS

| | | | |
|---|---|---|---|
| 4,764,773 | A | 8/1988 | Larsen et al. |
| 5,574,835 | A | 11/1996 | Duluk, Jr. et al. |
| 5,767,856 | A | 6/1998 | Peterson et al. |
| 5,867,166 | A | 2/1999 | Myhrvold et al. |
| 5,968,167 | A | 10/1999 | Whittaker et al. |
| 6,023,279 | A | 2/2000 | Sowizral et al. |
| 6,028,608 | A | 2/2000 | Jenkins |
| 6,073,210 | A | 6/2000 | Palanca et al. |
| 6,105,127 | A | 8/2000 | Kimura et al. |
| 6,111,582 | A | 8/2000 | Jenkins |
| 6,323,860 | B1 | 11/2001 | Ming et al. |
| 6,380,935 | B1 | 4/2002 | Heeschen et al. |
| 6,556,200 | B1 | 4/2003 | Pfister et al. |
| 6,593,929 | B2 | 7/2003 | Van Hook et al. |
| 6,631,419 | B1 | 10/2003 | Greene |
| 6,731,304 | B2 | 5/2004 | Sowizral et al. |
| 6,856,320 | B1 | 2/2005 | Rubinstein et al. |
| 6,897,871 | B1 | 5/2005 | Morein et al. |
| RE39,278 | E | 9/2006 | Yukitake et al. |
| 7,289,118 | B2 | 10/2007 | Schmittler et al. |
| 7,310,100 | B2 | 12/2007 | Hussain |
| 7,324,115 | B2 | 1/2008 | Fraser |
| 7,327,369 | B2 | 2/2008 | Morein et al. |
| 7,333,107 | B2 | 2/2008 | Papageorgiou |
| 7,348,975 | B2 | 3/2008 | Reshetov et al. |
| 7,362,332 | B2 | 4/2008 | Gritz |
| 7,405,734 | B2 | 7/2008 | Foran |
| 7,479,962 | B2 | 1/2009 | Herken |
| 7,483,024 | B2 | 1/2009 | Maillot |
| 7,688,320 | B2 | 3/2010 | Shearer |
| 7,742,053 | B2 | 6/2010 | Lefebvre et al. |
| 7,782,318 | B2 | 8/2010 | Shearer |
| 7,830,379 | B2 | 11/2010 | Peterson et al. |
| 7,834,872 | B2 | 11/2010 | Fenney et al. |
| 7,881,755 | B1 | 2/2011 | Mishra et al. |
| 8,018,457 | B2 | 9/2011 | Peterson et al. |
| 8,046,761 | B2 | 10/2011 | Howson |
| 8,059,123 | B1 | 11/2011 | Laine et al. |
| 8,065,288 | B1 | 11/2011 | Garland et al. |
| 8,115,763 | B2 | 2/2012 | Woop et al. |
| 8,174,531 | B1 | 5/2012 | Lindholm et al. |
| 8,188,996 | B2 | 5/2012 | Dammertz et al. |
| 8,405,665 | B2 | 3/2013 | Lindholm et al. |
| 8,670,483 | B2 | 3/2014 | Morphet et al. |
| 9,424,685 | B2 | 8/2016 | Howson et al. |
| 10,217,266 | B2 | 2/2019 | Howson et al. |
| 10,909,745 | B2 * | 2/2021 | Howson ............ G06T 15/06 |
| 2002/0039100 | A1 | 4/2002 | Morphet |
| 2003/0120886 | A1 | 6/2003 | Moller et al. |
| 2004/0138953 | A1 | 7/2004 | Van Luchene et al. |
| 2004/0233207 | A1 | 11/2004 | Morphet |
| 2005/0264568 | A1 | 12/2005 | Keller |
| 2006/0053189 | A1 | 3/2006 | Mantor |
| 2006/0132350 | A1 | 6/2006 | Reshetov |
| 2007/0132754 | A1 | 6/2007 | Reshetov et al. |
| 2007/0132772 | A1 | 6/2007 | Morphet |
| 2007/0146378 | A1 | 6/2007 | Sorgard et al. |
| 2007/0182732 | A1 | 8/2007 | Woop et al. |
| 2008/0211804 | A1 | 9/2008 | Hempel et al. |
| 2009/0322752 | A1 | 12/2009 | Peterson et al. |
| 2010/0053162 | A1 | 3/2010 | Dammertz et al. |
| 2011/0043521 | A1 | 2/2011 | Smyth |
| 2011/0170756 | A1 * | 7/2011 | Schneider ............ G06T 15/08 382/243 |
| 2013/0033507 | A1 | 2/2013 | Kirill et al. |

OTHER PUBLICATIONS

Budge Out-of-core Data Management for Path Tracing on Hybrid Resources Eurographics vol. 28, No. 2 (2009).

C. Benthin, I. Wald, M. Scherbaum and H. Friedrich, "Ray Tracing on the Cell Processor," IEEE Symposium on Interactive Ray Tracing 2006, Sep. 18-20, 2006, pp. 15-23, Salt Lake City, UT.

Geoff Wyvill, "Practical Ray Tracing," Computer Graphics International 1995, Tutorial notes.

H. Du, M. Sanchez-Elez, N. Tabrizi, N. Bagherzadeh, M.L. Anido and M. Fernandez, "Interactive Ray Tracing on Reconfigurable SIMD MorphoSys," Proceedings of the Design, Automation and Test in Europe Conference and Exhibition, 2003, Asia and South Pacific Jan. 21-24, 2003, pp. 471-476.

Horiguchi, S., Katahira, M., Nakada, T., Parallel processing of incremental ray tracing on a shared-memory multiprocessor, 1993, The Visual Computer, vol. 9, No. 7, pp. 371-380.

I. Wald, P. Slusaliek and C. Benthin, "Interactive Distributed Ray Tracing of Highly Complex Models," Rendering Techniques 2001—Proceedings of the 12th EUROPGRAPHICS Workshop on Render, pp. 274-285, London, England, Jun. 2001.

I. Wald, P. P Slusallek, C. Benthin and M. Wagner, "Interactive Rendering with Coherent Ray Tracing," Computer Graphics Forum, Proceedings of EUROGRAPHICS 2001, vol. 20, No. 3, 2001.

J - G- Cleary, B.M. Wyvill, G.M. Birtwistie and R. Vatli, "Multiprocessor Ray Tracing," Computer Graphics Forum, vol. 5, issue 1, pp. 3-12, 1986.

James Arvo and David Kirk, "Fast Ray Tracing by Ray Classification," ACM SIGGRAPH Computer Graphics 21 (4), Jul. 1987, pp. 55-64.

James Bigler, Abe Stephens and Steven G. Parker, "Design for Parallel Interactive Ray Tracing Systems," Proceedings of the IEEE Symposium on Interactive Ray Tracing, 2006, pp. 187-196.

Jorg Schmittler, Ingo Wald, and Philipp Slusallek, "SaarCOR—A Hardware Architecture for Ray Tracing," Proceedings of the ACM SIGGRAPH/EUROGRAPHICS conference on Graphics hardware, Saarbrucken, Germany, Session: Ray tracing vs. scan conversion, pp. 27-36, 2002.

Kaeriyama Y et al: "Multi-core data streaming architecture for ray tracing", Computer Design, 2007. ICCD 2007. 25th International Conference On, IEEE, Piscataway, NJ, USA, Oct. 7, 2007 (Oct. 7, 2007), pp. 171-178, XP031308348, ISBN: 978-1-4244-1257-0.

M. Sanchez-Elez, H. Du, N. Tabrizi, Y. Long, N. Bagherzadeh and M. Fernandez, "Algorithm Optimizations and Mapping Scheme for Interactive Ray Tracing on a Reconfigurable Architecture," Computers & Graphics 27(5), 2003, pp. 701-713.

Martin Christen, "Ray Tracing on GPU," Master's thesis, Univ. of Applied Sciences Basel (FHBB), Jan. 19, 2005 (Available online at http://gpurt.sourceforge.net/DA07.sub.-0405.sub.-Ray.sub.-Tracing.sub-on.sub.-GPU-1.0.5.pdf, last visited Dec. 10, 2009).

P. H.Christensen, J. Fong, D. M. Laur and Dana Batali, "Ray Tracing for the Movie 'Cars'," IEEE Symposium on Interactive Ray Tracing, 2006, pp. 1-6.

Parker, Steven G., et al. "Optix: a general purpose ray tracing engine." ACM Transactions on Graphics (TOG). vol. 29. No. 4. ACM, 2010.

Purcell et al.; Ray Tracing on Programmable Graphics Hardware; ACM Trans. Graph. 21 (3) pp. 703-712; Jul. 2002.

Reinhard, Erik, Alan Chalmers, and Frederik W. Jansen. "Hybrid scheduling for parallel rendering using coherent ray tasks." Proceedings of the 1999 IEEE symposium on Parallel visualization and graphics. IEEE Computer Society, 1999.

(56) References Cited

OTHER PUBLICATIONS

Spjut "TRaX: A Multi-Threaded Architecture for Real-Time Ray Tracing" Application Specific Processors, 2008. SASP 2008. pp. 108-114.
Stamminger "Walkthroughs with Corrective Texturing" (2000) available at http://www.mpi-sb.mpg.de.
Sugerman, "GRAMPS: A Programming Model for Graphics Pipelines", ACM Transactions on Graphics, vol. 28, No. 1, Article 4, Publication date: Jan. 2009.
Sven Woop, Jorg Schmittler and Philipp Slusallek, "RPU: A Programmable Ray Processing Unit for Realtime Ray Tracing," ACM Transactions on Graphics (TOG), vol. 24, Issue 3, (Jul. 2005), Proceedings of ACM SIGGRAPH 2005, session: Hardware rendering, pp. 434-444, 2005.
W.R. Mark and D. Fussell, "Real-Time Rendering Systems in 2010," The University of Texas at Austin, Department of Computer Sciences, Technical Report #TR-05-18, May 2, 2005. (Available at http://www-csl.csres.utexas.edu/users)billmark/papers/rendering2010-TR/TR- 05-18-Rendering2010.pdf, last visited Jan. 7, 2008.).
Wald et al; State of the Art in Interactive Ray Tracing; Eurographics'01; ACM 2001.
(\*\*NOTE\*\*—NPL in parent applications).

\* cited by examiner

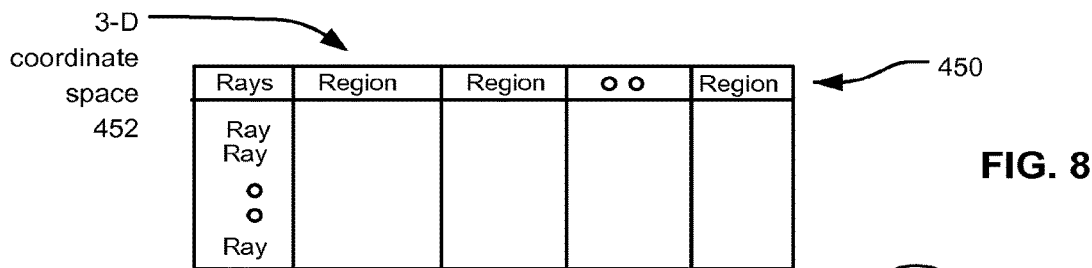
FIG. 8
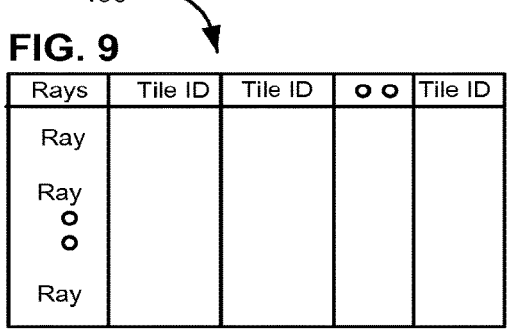
FIG. 9
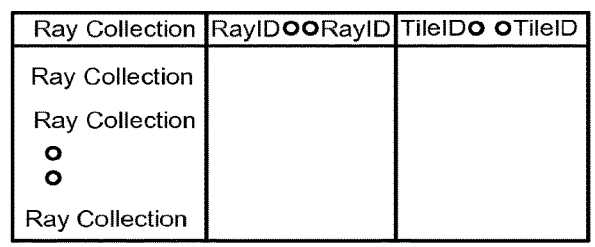
FIG. 10
FIG. 11
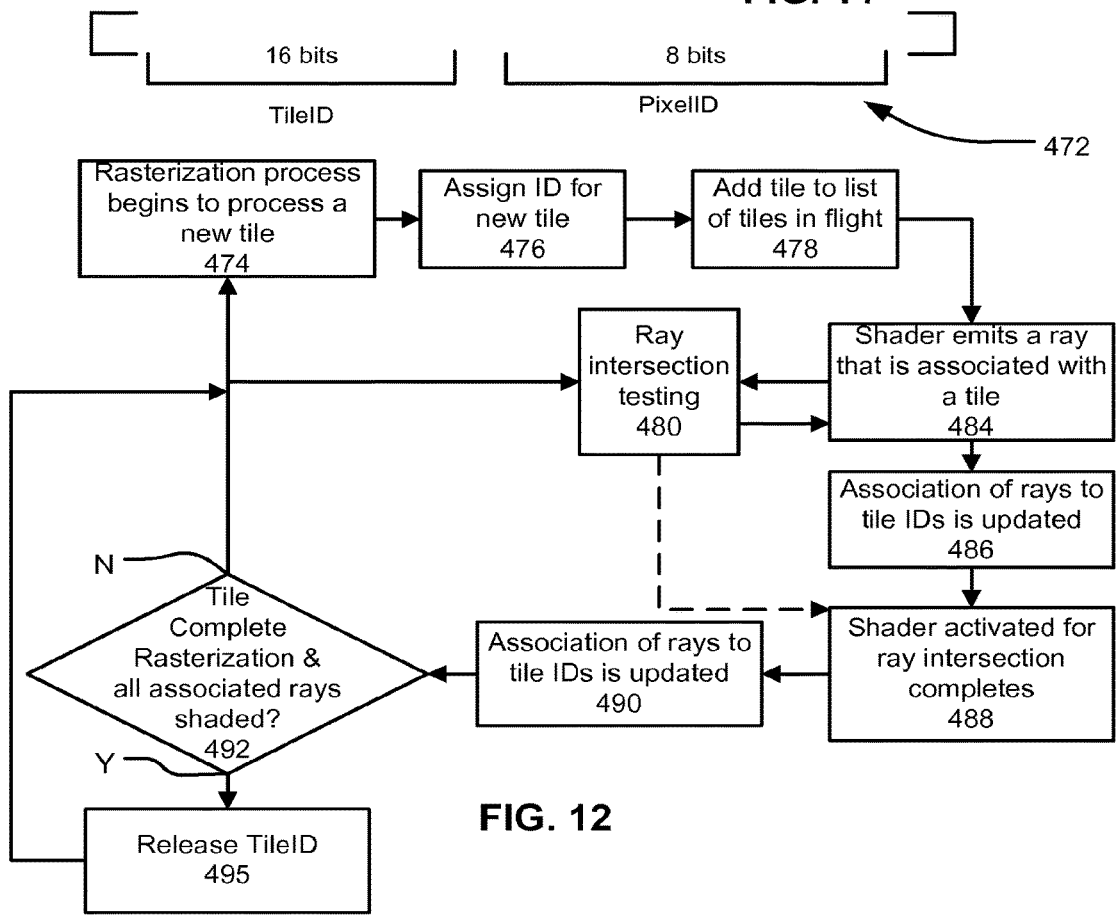
FIG. 12

UNIFIED RASTERIZATION AND RAY TRACING RENDERING ENVIRONMENTS

CROSS REFERENCE TO RELATED APPLICATIONS

This application claims priority from U.S. Provisional Patent App. No. 61/678,055, filed on Jul. 31, 2012, entitled "UNIFIED RASTERIZATION AND RAY TRACING RENDERING ENVIRONMENTS", which is incorporated by reference in its entirety herein for all purposes.

BACKGROUND

Field

The following relates to approaches to 3-D rendering and architectures for performing 3-D rendering.

Related Art

3-D rendering involves producing images from 3-D scene descriptions. The images can be photorealistic, or achieve other objectives. For example, animated movies can be produced using 3-D rendering techniques.

A variety of techniques for performing 3-D rendering are known. Two principal categories of 3-D rendering are rasterization oriented approaches, and ray tracing oriented approaches. Rasterization involves defining a view point for a 3-D scene containing geometry and a pixel array to be rendered from the scene. In most rasterization approaches, the geometry is reduced to triangular primitives, and those primitives are transformed into 2-D coordinates, with a depth value. It is determined what primitive is visible from each pixel (or part of a pixel), and that visible surface is shaded. Rasterization benefits from being able to easily parallelize computation, because each pixel is independent, and geometry can be streamed geometry through a rasterization pipeline for processing. Rasterization thus is still the leading approach to time sensitive rendering applications, such as video games. However, it is difficult and time consuming to produce sophisticated rendering outputs using rasterization Ray tracing can model the natural interaction of light with objects, and sophisticated rendering features can naturally arise from ray tracing a 3-D scene. Ray tracing can be parallelized relatively easily on the pixel by pixel level also, because pixels generally are independent of each other. However, ray tracing cannot be pipelined in the same way as rasterization, because of the distributed and disparate positions and directions of travel of the rays in the 3-D scene, in situations such as ambient occlusion, reflections, caustics, and so on.

SUMMARY

In one aspect, a method of rendering comprises identifying one or more visible surfaces, from among surfaces in a 3-D scene, from a view position. The identified one or more visible surfaces comprise visible surfaces for a plurality of pixels located in 2-D screen space. The method provides for preparing, concurrently with the identifying, to execute shaders associated with respective visible surfaces of pixels that have completed the identifying. The preparing includes completing a respective normalized set of inputs to be provided to each shader for use during execution. The method also includes executing each of the shaders, in a computation cluster. Each of the executing shaders comprises one or more operations, selected from operations including defining one or more rays to be tested for intersection with surfaces in the 3-D scene. The method also includes intersection testing at least some of the rays concurrently with the identifying and the executing of the shaders; and shading identified intersections for rays completing intersection testing within the computation cluster.

In another aspect, a method of rendering comprising inputting geometry data describing surfaces located in a 3-D scene and tesselating inputted geometry and outputting tesselated geometry. The method includes receiving the tesselated geometry in a ray tracing acceleration structure builder and forming an acceleration structure for use in ray intersection testing of the tesselated geometry. The method also includes transforming the tesselated geometry from a primary viewer position and for a pixel array of a defined resolution and location, into 2-D pixel coordinates, with depth. The transformed tesselated geometry is rasterized to determine at least one visible surface for each pixel of the pixel array. For each visible surface, one or more shaders are executed in a shared shader computation unit, where the executing for one or more of the fragment shaders comprises using an API semantic to obtain 3-D coordinates for vertices defining the visible surface. Tesselation can be performed in real-time for portions of the 3-D scene, and tesselated geometry can be fed to ray tracing processes, including intersection testing and acceleration structure building, responsive to ray intersection testing progress. Systems can include functional units to implement these processes.

An example aspect according to the disclosure includes a fixed function ray intersection testing unit, which is operable to return data for a detected intersection, and a scan conversion pipeline capable of identifying visible surfaces for fragments or pixels of an image. Each of these units couples with a shader pre-processing unit configured to produce common parameter data so that outputs of each unit can be used by one or more instances of the same shading code.

A further example aspect relates to systems and methods for controlling a cache of tile-based rendering outputs based on a status of processing of rays that may contribute to a final color of a pixel within a given tile. A further example aspect relates to systems and methods for scheduling rays for intersection testing and/or shading based on status of which rays will contribute to which screen tiles, during rendering using a hybrid approach of both rasterization and ray tracing. A further example relates to systems and methods for scheduling geometry transformation or tesselation tasks on demand, based on joint ray tracing and rasterization status information. These transformations or tasks can be implemented in special purpose circuitry and/or programmable computation units.

Other constituent elements of architectures and processes implemented on such architectures can include ray population control features, which relatively prioritize ray processing tasks, according to status and objectives, and also can control a rate of processing in rasterization.

BRIEF DESCRIPTION OF THE DRAWINGS

FIG. 8 depicts maintaining associations of rays to regions of a 3-D scene in which they are to be traced;

FIG. 9 depicts maintaining data associating rays to tiles defined for rasterization processes;

FIG. 10 depicts associating ray collections with information about rays in the collection, and tiles associated with the rays in that collection;

FIG. 11 depicts an example of an identifier that has tile and pixel components;

FIG. 12 depicts a process of assigning tile identifiers for tiles being processed;

DETAILED DESCRIPTION

The following disclosure includes multiple examples of graphics processing architectures, in which a unified computation resource performs shading work concurrently for surfaces identified by both ray tracing and by rasterization techniques. In one aspect, a unified computation resource executes shaders based on a normalized set of inputs, and a given surface is shaded by an associated shader module, regardless whether that surface is to be shaded responsive to a ray intersection or during rasterization. In another aspect, different shader code modules may exist for shading ray tracing intersections and for rasterization. In implementations according to such aspects, surface shaders for rasterization offer a capability to emit rays to be intersection tested, and to perform shading, in dependence on the results of intersection testing that ray.

In some implementations of the disclosure, there are multiple concurrently executing processes that either have dedicated hardware for performing those processes, or are scheduled on the unified computation resource. In one example, a rasterization unit inputs scene geometry and performs rasterization operations to produce visible surfaces for pixels, which are to be shaded, a ray intersection testing unit traverses rays through a scene hierarchy, and tests rays for intersection with 3-D scene geometry to identify ray intersections, which are to be shaded. The shading in both cases is scheduled on a unified computation resource.

The unified computation resource also can be scheduled to execute geometry shader and transformation operations. As a specific example, where a shader invoked in response to rasterization emits a ray, that shader continues executing and ultimately completes its execution, without being involved in the processing of the ray that it emitted. Rather, in such an example, the ray is processed as a separate and independent computation workload by the ray intersection testing unit, and as necessary, the unified shader resource. Thus, the rasterization-invoked shader does not itself include the computations for testing a ray with elements of a scene hierarchy, for example. As such, ray tracing and rasterization operations proceed concurrently in a wide variety of situations. With this overview, more details are presented in the following disclosure.

Regardless whether 3-D rendering is being performed using rasterization techniques or ray tracing (or both), two principal categories of activities to be performed are (1) identifying surfaces of 3-D scene geometry that may need to be shaded or otherwise processed during rendering of a 2-D image; and (2) determining what effect that surface should have on an image being rendered. However, these constituent operations have different processing, data access, and data flow implications for rasterization and for ray tracing.

Figure 1:
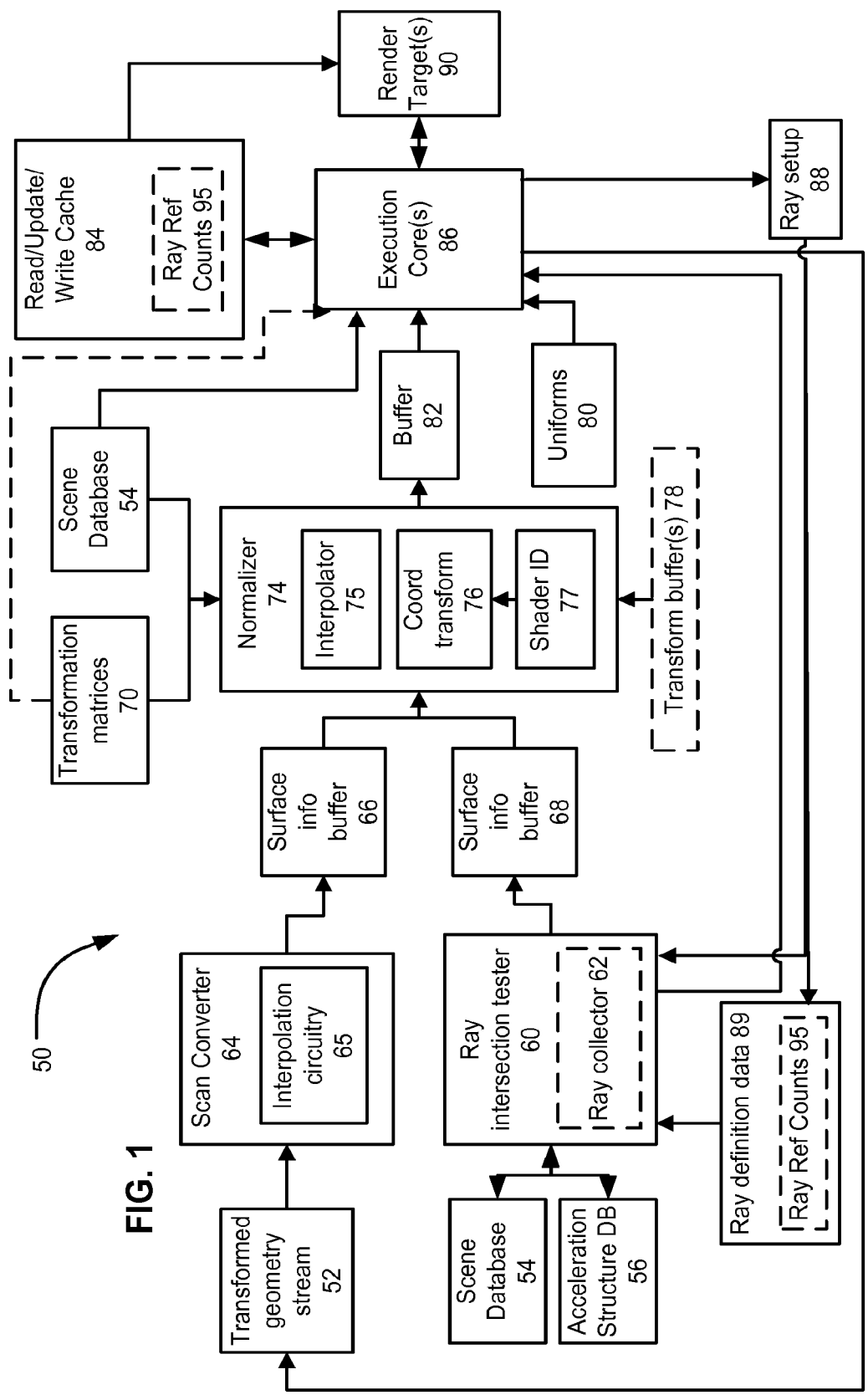
FIG. 1 depicts an example architecture embodying aspects of the disclosure.

FIG. 1 depicts an example graphics processing architecture 50, according to one or more of the above-described aspects. Some details of actual implementations of architecture 50 have been omitted for clarity. For example, a variety of preliminary operations, such as view frustrum clipping may occur in such implementations, but are not specifically addressed herein. This description also proceeds from a point in which such conventional operations have been performed.

Rasterization oriented aspects of architecture 50 are discussed first. A scan conversion module 64 receives a stream 52 of transformed geometry. Stream 52 is shown as being outputted from a shader execution environment 86 (described below). Transformed geometry 5 is geometry that was defined in a 3-D coordinate space, and was perspective transformed into a 2-D pixel coordinate system, and which can include depth information. The perspective from which the transformation is made can include a viewpoint, from which a 2-D pixel array is to be rendered from the 3-D scene. The transformed geometry 5 can be read from a memory, or be produced on the fly or some combination thereof. In addition to perspective transformation, a variety of other transformations can be performed on 3-D geometry, such as from 3-D model coordinates to 3-D world coordinates. In any case, in this example, scan conversion module 64 can receive a stream of transformed vertices, representing primitives on which scan conversion module 64 will operate.

Scan conversion module 64 is responsible for determining which pixels or fragments of pixels are within a boundary of the surface defined by the transformed vertices performs scan conversion on an input stream 52 of geometry. This scan conversion module 64 can receive vertices for geometry that is found to be potentially visible from the viewpoint represented by the perspective transformation (e.g., following clipping, backface culling, and so on).

Scan conversion module 64 can proceed differently in different implementations. For example, in a deferred shading architecture, all the geometry that is potentially visible within a pixel is scan converted, and those surfaces that are found to contribute to an image (for simplicity, called "visible surface(s)") are found before any surface shading is performed (surface shading here being used to refer to executing code in shader execution environment 86, identified based on the surface). Deferred shading avoids performing work that ultimately will not contribute to the rendering, because a particular shaded surface ultimately may be obscured by another surface, closer to the viewpoint. In an architecture implementing an immediate mode, each time a primitive is scan converted, a surface shader can be invoked to shade that surface, even though that surface may ultimately be obscured by a closer surface. By further example, scan conversion can be performed for tiles of pixels, such as a rectangular or square tile of pixels, such as an 4×4, or an 8×8 tile, and scan conversion does not imply processing pixels in a linear sequence.

Additionally, scan conversion module 64 includes interpolation circuitry 65, which performs interpolations on attributes associated with the transformed vertices. For example, during scan conversion, scan conversion module 64 interpolates vertex attributes across a surface defined by the vertices (recall that the surface was defined in 3-D space by 3-D coordinates, but was mapped to 2-D pixel space, and these interpolations are performed in the 2-D pixel space), in order to determine values for the attributes at specific points on the primitive. For example, vertices may include a variety of attributes, such as normals, texture coordinates, and color. Depending on what kinds of shading algorithms are used, these kinds of data are interpolated to produce pixel or fragment specific values. For example, vertex normals can be interpolated across the 2-D pixel space occupied by the primitive being scan converted. Interpolated attributes can be stored. In some implementations, interpolations can be performed only for surfaces determined to be visible, or only for the visible portions of a given surface. Such visibility can include visibility at a pixel of an image being rendered, or visibility from a ray origin (such as determined by a ray that intersected a point).

Outputs of scan conversion module 64 are buffered in buffer 66, which feeds a normalizer 74. Normalizer 74 comprises a set of functionality that normalizes outputs of visible surface determination, such as an interpolator 75, a viewer calculation module 76, and a shader ID module 77. Although FIG. 1 depicts an example of producing and storing attribute information, such information also can be produced offline, stored and retrieved for use.

Normalizer 74, in addition to receiving outputs of scan conversion module 64 (e.g., through buffering 66), receives outputs of a ray intersection tester 60. Ray intersection tester 60 has random read access to a scene database 54 and an acceleration structure database 56. Scene database 54 stores 3-D coordinates for surfaces of scene geometry (which was transformed for scan converter 64, as described above). Acceleration structure database 56 stores an acceleration structure that abstracts portions of the geometry, so that rays are first tested against elements of the acceleration structure to identify smaller subsets of geometry to test for intersection with each ray. In an example implementation, ray intersection tester 60 operates to test collections of rays concurrently, where those collections are maintained by a ray collector 62, which can have a local memory store that tracks collections of rays in association with acceleration structure element(s) to be tested for intersection with rays of such collection. Ray intersection tester 60 receives rays to be tested for intersection from a ray setup module 88, which interfaces with shaders executing in shader execution environment 86. In some examples, a fast memory, local to ray intersection tester 60, stores ray definition data and other information, such as a current closest detected intersection, for rays being processed by tester 60. Ray definition data 89 can be populated by ray setup 88. Outputs of ray intersection tester can be buffered by buffer 68, which in turn provides inputs to normalizer 74. Such outputs can include information identifying an intersection or intersections (e.g., a closest intersection) for a given ray, as well as other intersection information, such as barycentric coordinates or other information about a hit point on a primitive. Such information can also be expressed as a reference to a location in memory from which normalizer 74 can read.

Returning to normalizer 74, normalizer 74 can have access to transformation matrices 70, which were used during geometry setup to produce transformed geometry stream 52. Normalizer 74 also can have access to transform buffer(s) 78, which store portions of scene geometry (e.g., vertex and/or parameter data) after one or more transformations have been effected on the geometry; buffer(s) 78 may be provided, for example, because some implementations do not necessarily save geometry data, such as transformed vertex data, once it passes through scan conversion. Normalizer 74 also can have read access to scene database 54. As described in more detail below, normalizer 74 functions to produce or provide shader setup data in a way that can be consumed by a shader, regardless whether the surface to be shaded was produced (or identified for shading) by ray intersection tester 60 or by scan converter 64.

Normalizer 74 outputs normalized shader setup data to buffer 82, which feeds shader execution environment 86. Shader execution environment can have access to scene database 54, transformation matrices 70, global rendering setup data (uniforms 80), a read/update/write cache 84, and render target(s) 90. Here, cache 84 is identified separately from render target(s) 90, although both in effect can store results of shading computations, and also serve as a source of inputs to shading computations. Functionality and interoperation of various components of FIG. 1 will be exemplified in the following description.

Figure 2:
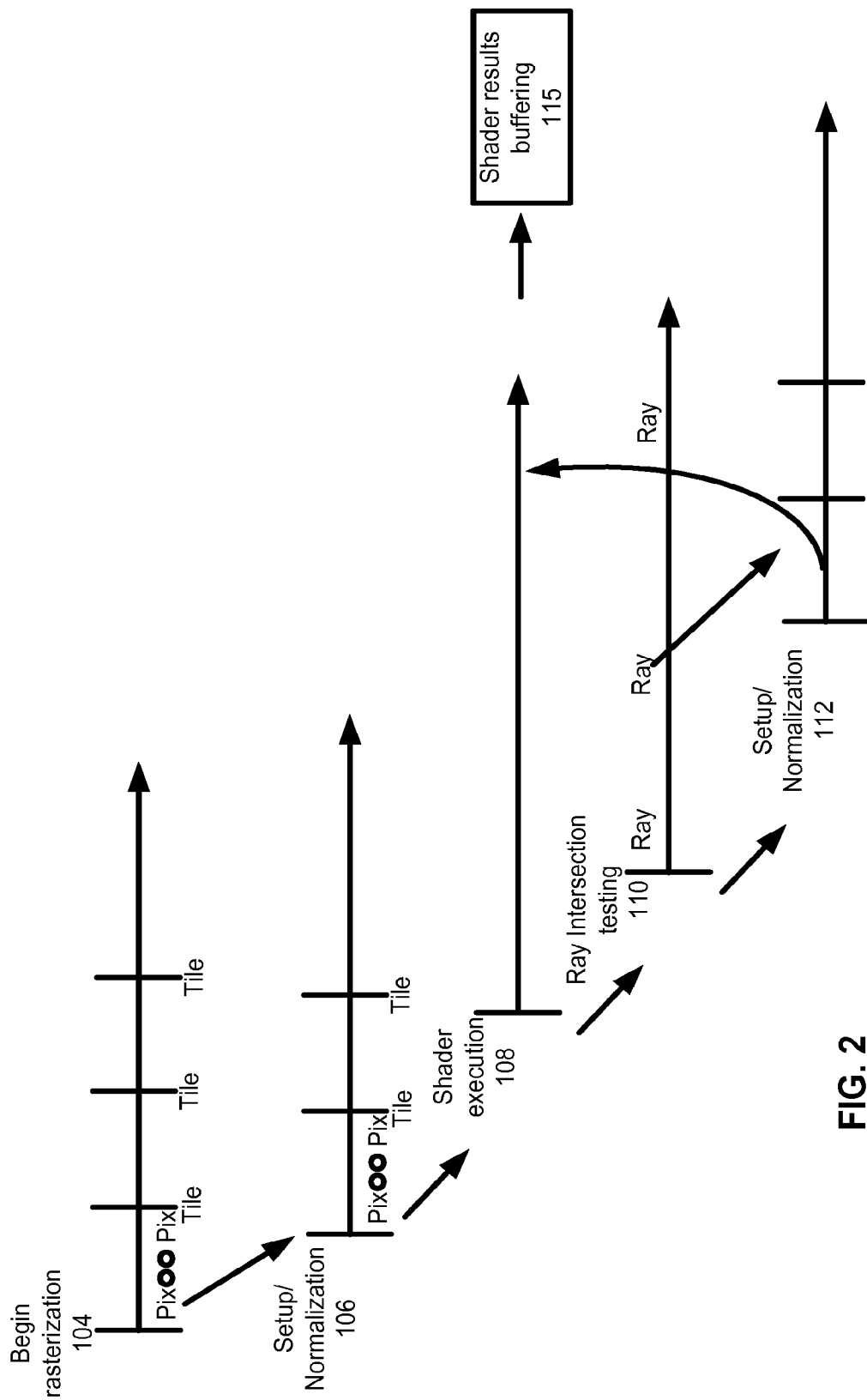
FIG. 2 depicts aspects of computation and data flow in the example architecture of FIG. 1 situation where reentrancy of a program module is a consideration for correct execution.

FIG. 2 shows an overview of an example flow of computation, in a scenario where a rendering job begins with a rasterization pass for a 2-D image. In 104, rasterization begins, and proceeds pixel by pixel (or on fragments, but for simplicity, pixels are discussed), for each tile of a plurality of tiles, continuing until all the pixels have had transformed scene geometry 52 processed for them. During 104, visible surfaces (i.e., surfaces for which shaders may be invoked) for pixels will be identified over an elapsed period of time. For such surfaces, setup/normalization 106 is performed (e.g., by normalizer 74), and a shader begins execution 108 for that surface. During such execution, ray(s) may be defined ("emitted") by the shader, and are to be tested for intersection. The ray definitions can be received by ray setup 88, which can assign such ray to a location in ray definition data 89. In some implementations, an allocation of storage location for such ray determines a sub-portion of ray intersection tester 60 that will process that ray. In some implementations, ray intersection tester 60 defers processing of individual rays in order to process rays that have been grouped together according to a part of a scene in which those rays are to be tested for intersection with one or more of acceleration hierarchy elements and geometry. Thus, ray intersection testing 110 does not necessarily correspond to tracing a particular ray, responsive to its emission by shader execution 108, but generally shows concurrency of ray intersection testing 110 with other processes occurring in implementations of architecture 50. An output of ray intersection testing is fed to setup/normalization 112, which prepares inputs to be used by a shader that will shade an intersection for the now-completed ray, where that shader will execute within shader execution 108. All such shaders can output results for buffering 115 (or other storage or usage).

Figure 3:
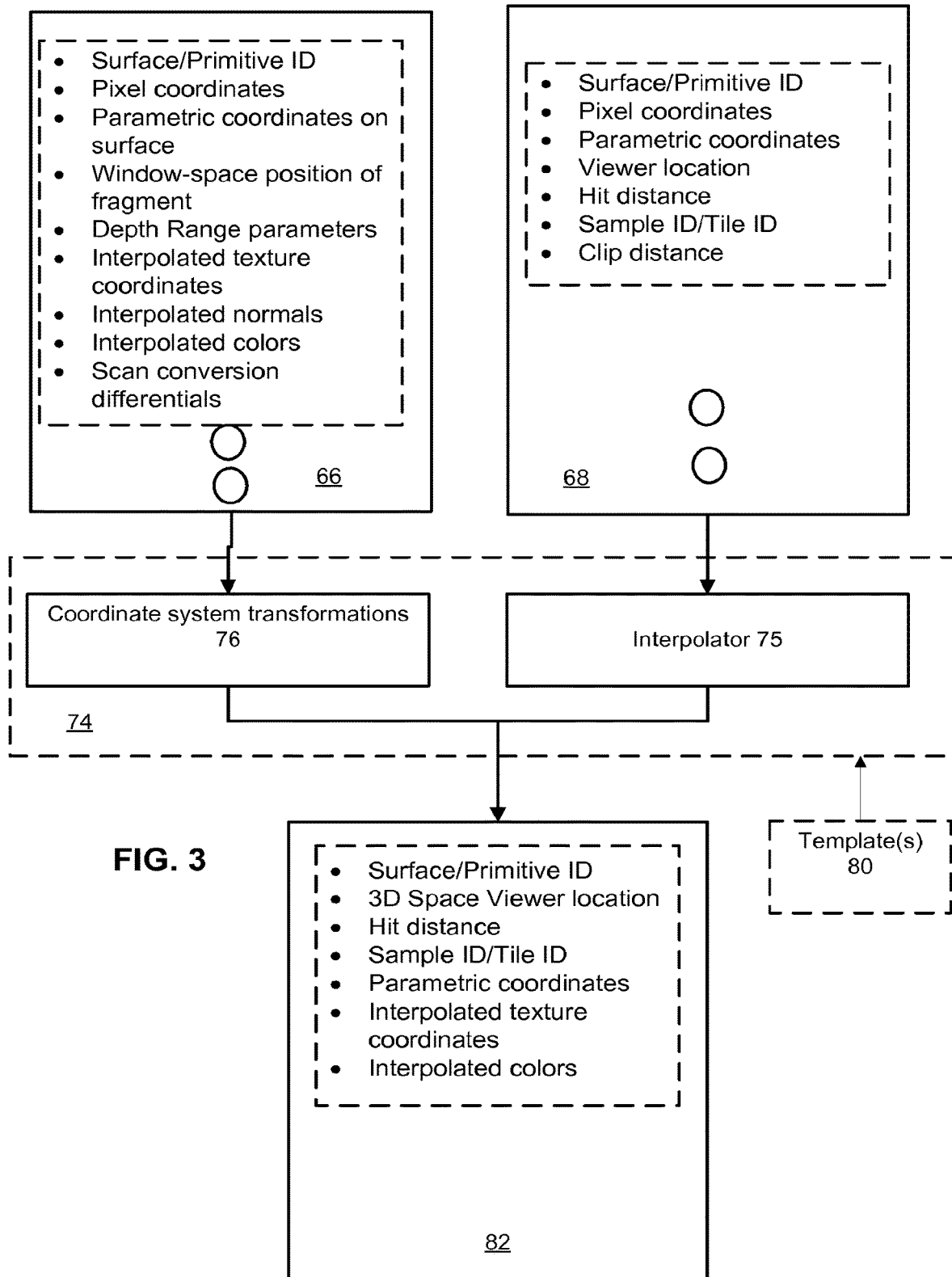
FIG. 3 depicts aspects of a data normalizer and normalization as shown in FIG. 1.

As can be discerned by one of ordinary skill, normalizer 74 is to prepare a set of inputs that will satisfy a shader for a surface, where that shader may perform processes traditionally associated with ray tracing as well as processes traditionally associated with rasterization-oriented shading. In a sense, normalizer 74 abstracts a type of visible surface determination that is causing a particular shader to be invoked. FIG. 3 presents an example of normalizing data, in the context of the buffering shown in FIG. 1 (which is an example that a person of ordinary skill would understand can be adapted.)

FIG. 3 depicts that buffering from rasterization 66 can store a variety of data (or in some implementations, can contain references to memory locations where such data is stored.) Examples of such data include an identifier of a surface, pixel coordinates, parametric coordinates relating to the surface, a window space position of a fragment or pixel, depth, depth ranges, depth range parameters, depth compare modes, clip position information, interpolated texture, normals and colors, and differentials that were used during scan conversion are examples of data, and such listing is not intended either as a minimum requirement or a complete specification, rather those of ordinary skill would adapt these disclosures for specific implementations. For example, some information available may depend on how rasterization was setup, e.g., if backface culling is off, then backfaces can be identified, and an indication of face direction would be provided. Also, in situations where fragments are being processed, relative positions of the fragments within the sample, and a number of samples per pixel provide examples of additional information that may be in buffer 66.

Similarly, buffer 68 is populated with data from ray intersection testing, which may include, as in the example of FIG. 3, a surface ID, pixel coordinates, parametric coordinates, viewer location, hit distance, simple/tile ID, and clip distance. Again, these are exemplary, and not exclusive or exhaustive.

FIG. 3 depicts that normalizer 74 inputs these data, from both buffer 66 and buffer 68 and makes normalized sets of information for each surface for which a shader will be invoked. As an example, for buffer 66, which includes surfaces identified through rasterization, a coordinate transformation can be performed for the position of the surface, which is specified in transformed coordinates in buffer 66, into a 3-D spatial coordinate. Additionally, further calculations can be done, such as using barycentric coordinates in buffer 66 and fragment information to identify a position on the surface in 3-D space. For example, normalizer 74 also can use an identifier of the primitive to obtain 3-D positions of vertices defining the primitive, and then, based on information in buffer 66, scene setup information, or both, determine a viewer position in 3-D space. Viewer position in 3-D space can be used for defining a ray that will be emitted during shading, such as for reflectance models. Thus, although a rasterization approach to visible surface determination does not return 3-D view position information for a surface to be shaded, normalizer 74 produces such information, so that a shader invoked for that surface can use that information. Buffer 66 would be expected to contain an entry for each pixel or fragment that was identified during scan conversion. Thus, a string of fragments or pixels may share a viewer position, and information stored in buffer 66 can be adapted in view of such redundancies.

Another example treats data resulting from surfaces identified by ray intersection testing. Ray intersection testing may generate barycentric coordinates of a hit point on a primitive, a distance from a view position, and a primitive identifier.

In brief, barycentric coordinate weights allow for identifying a point on a plane of a triangle as a weighted linear combination of vertices of the triangle, in a circumstance where the barycentric weights are all positive and add to one (so that the point is on the plane of the triangle). These barycentric coordinates are a natural byproduct of some ray intersection testing algorithms.

However, interpolated data for that hit point (or other points on the surface) would not be provided from ray intersection tester 60. Normalizer 74 contains interpolator 75, to which can be inputted the barycentric coordinates of the hit point. Normalizer 74 also can provide 3-D coordinate positional information for the vertices defining the identified surface, as well as obtaining or accessing information bound to those vertices (e.g., normals, texture coordinates, and so on). The barycentric coordinates are used to interpolate the values of the vertex attributes to provide a set of attributes that would be expected to be available from a scan converter.

Figure 7:
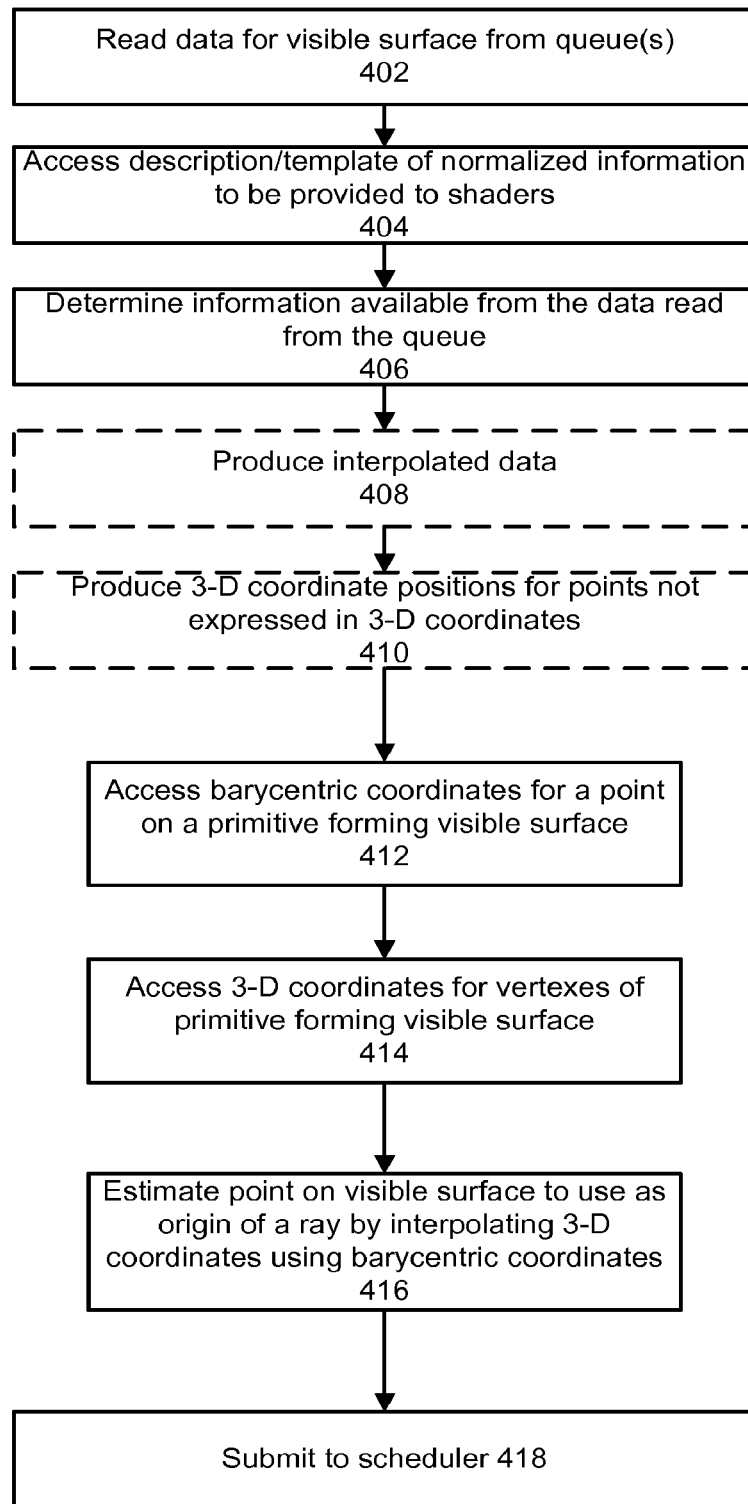
FIG. 7 depicts aspects of a further process that can be implemented.

FIG. 3 also depicts that one or more templates 80 can be made available, which operate to specify what kinds of data normalizer 74 should produce. These templates 80 can be produced by a compiler analyzing the types of inputs required by surface shaders during a render setup process. For example, a set of geometry may have colors associated with the vertices, but if surface shaders do not use interpolated vertex colors during shading, then templates 80 may not include a requirement that interpolator 75 produce this data for entries in buffer 68, and likewise may exclude such data from entries in buffer 66, so that normalized entries in output buffer 82 conform to the set of inputs for that specific rendering task. FIG. 3 depicts an example of a normalized set of data, which would be generated for each entry of buffers 66 and 68. FIG. 7 provides an example process which can be implemented by normalizer 74. At 402, visible surface shading data is read from a queue, and at 404, a description or template of normalized information to be provided to shaders is accessed. At 406, a determination of information available for the data read from the queue is made and such determination controls what data is generated or removed. For example, at 408, interpolated data is produced where the data read from the queue does not include such interpolated data, and at 410 coordinate transformations can be performed to generate 3-D positional information.

For example, at 412, barycentric weights for a point on a primitive to be shaded (a visible surface) are accessed. 3-D coordinates for vertices of the primitive can be accessed at 414, and at 416, an estimate of a point on the primitive from which to cast a ray can be made. At 418, the data can be made available for a shader execution environment. For example, this data may be stored in a memory that can be accessed by the shader execution environment.

Figure 4:
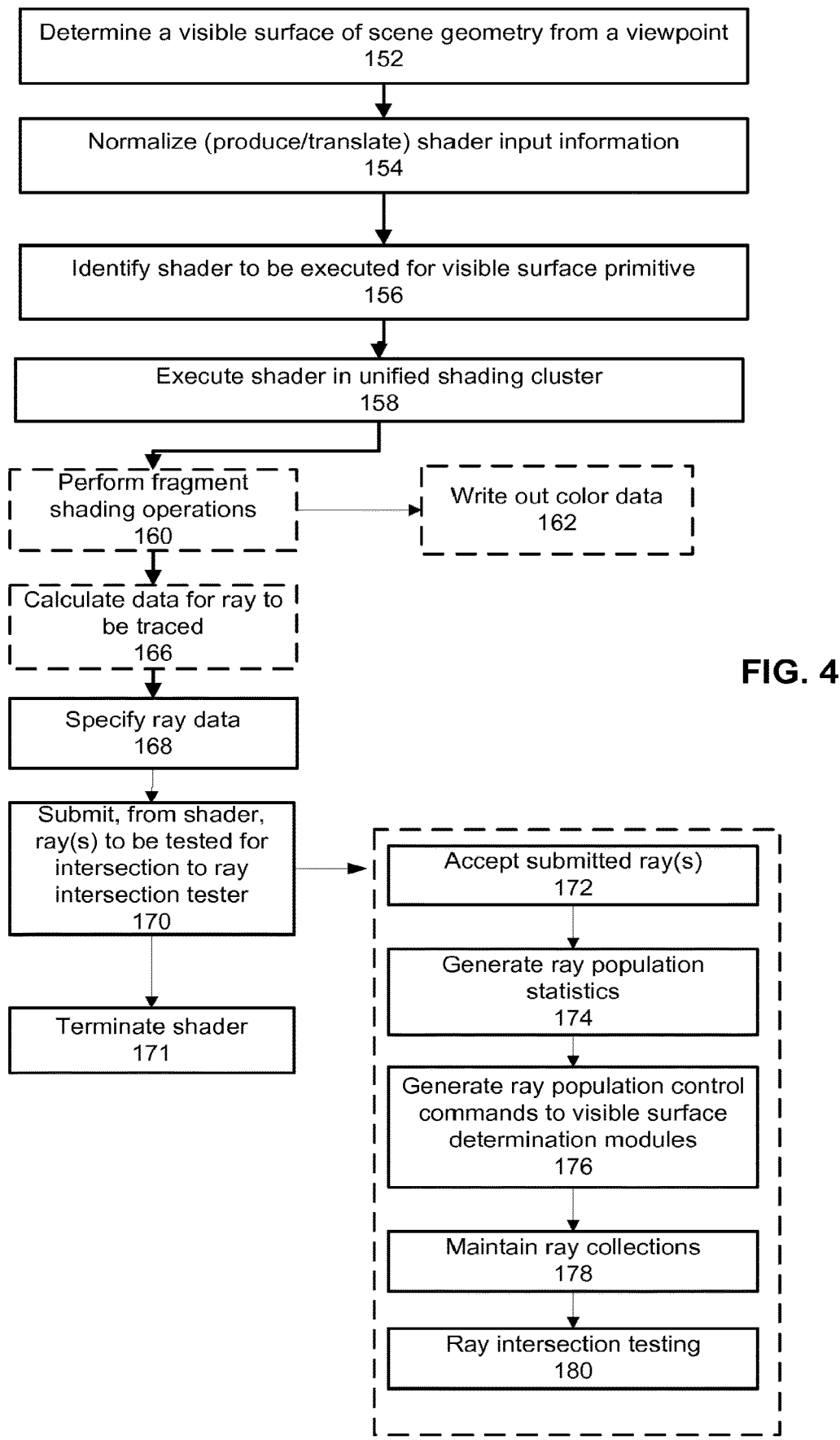
FIG. 4 depicts aspects of example process that can be performed in implementations according to FIG. 1.

FIG. 4 depicts aspects of an example process which can be performed by implementations of architecture 50. At 152, determining of a visible surface, from a viewpoint, is performed. As discussed above, such determining can be performed by scan conversion (immediate and deferred approaches) or by ray tracing. At 154, outputs from the determining of the visible surface are normalized (see discussion relating to FIG. 3, above). At 156, a shader is identified to be executed for the visible surfaces. At 158, each identified shader is executed on a unified shading resource (e.g., a set of computation elements, such one or more clusters of SIMD processors). During such execution, these shaders can, at 160, perform fragment shading operations, which result in color data that can be written out, at 162, e.g., to a buffer. Also, at 169, ray data can be specified, and at 170, that ray data can be submitted from the shader to result in a ray that will be tested for intersection within ray intersection tester 60. At 171, the shader can terminate execution. FIG. 4 thus depicts that a single shader can be invoked for shading a surface, and can perform fragment shading operations as well as emit rays for intersection testing, and then, in one example, to terminate execution, before the ray(s) emitted by that shader are resolved. Thus, shader processes for ray intersections and for scan converted surfaces can proceed concurrently with ray intersection testing and with scan conversion.

FIG. 4 also depicts aspects of handling submitted rays, in which at 172, submitted rays are accepted. At 174, statistics concerning a current ray population are generated/updated in accordance with the accepted rays. Ray population statistics can include, for example, a total ray population, and respective ray populations waiting to be processed in different parts of an acceleration structure. Responsive to these population statistics, at 176, ray population control commands can be generated to the visible surface determination modules. For example, if a ray population is increasing, ray population control commands can reduce a rate of scan conversion, so that shaders are invoked at a lower rate. Other kinds of population control commands can be issued, such as commands directed to prioritizing certain surface shaders, or prioritizing certain sets of rays. For example, rays can be associated with pixels; if greater than a threshold time period has elapsed since that pixel was first scan converted, then rays still referencing that pixel can be prioritized to complete intersection testing.

FIG. 4 continues at 178 with maintaining ray collections, which can include adding the accepted submitted rays to one or more ray collections. FIG. 4 also depicts, at 180 scheduling of ray collections for intersection testing.

Figure 5:
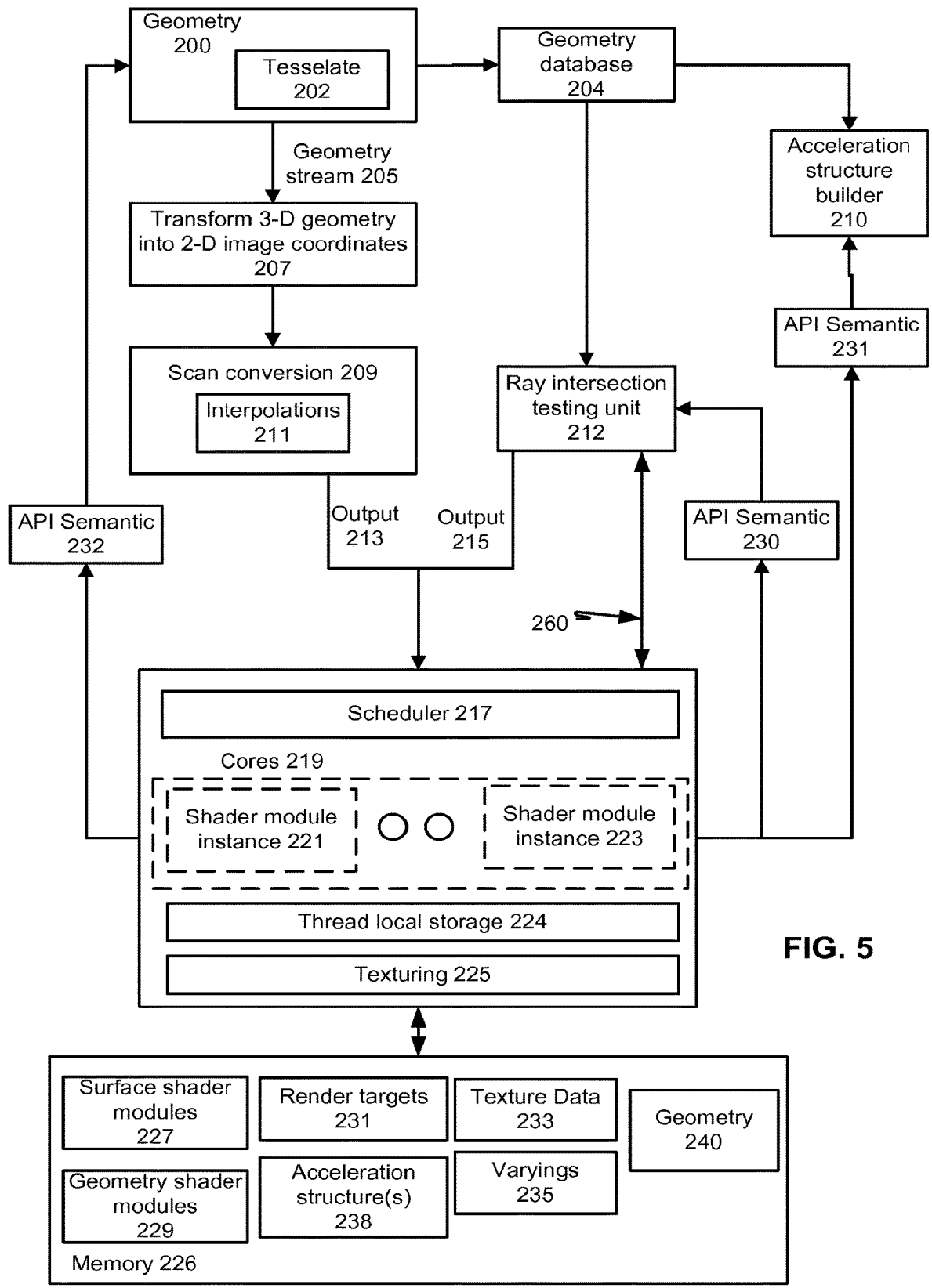
FIG. 5 depicts aspects of another example architecture.

FIG. 5 depicts another example computation architecture in which aspects of the disclosure can be practiced. FIG. 5 depicts a geometry unit 200, which includes a tesselator 202. Geometry unit 200 feeds a geometry database 204, e.g., for storing tesselated geometry. Geometry database 204 provides inputs to an acceleration structure builder 210. Geometry 200 also outputs a geometry stream 205, which is input to a transform unit 207 that transforms 3-D geometry in stream 205 to 2-D image coordinates. Scan conversion 209 performs scan conversions in conjunction with interpolator 211, as in FIG. 1. Geometry database 204 also provides inputs to ray intersection testing unit 212 (such as for use during primitive intersection testing).

Ray intersection testing unit 212 outputs indications 215 of ray intersections, while scan converter 209 outputs fragment or pixel data 21. A set of cores 219 receives outputs 213 and 215, and a scheduler 217 determines how cores 219 are allocated for executing shaders invoked in response to outputs 213 and 215. For example, shading cores 219 can execute shader module instances 221-223, which can be instances of the same shader module or of various shader modules. Cores 219 can share texturing functions 225, such as texture decompression, and sampling circuitry. Cores 219 can execute using data stored in thread local storage 224, as well as using a main memory 226 hierarchy. FIG. 5 depicts that memory 226 can store surface shader modules 227, which can be generic for any kind of surface shading task (e.g., ones originated from scan conversion and from ray tracing), or they can be specific. For example, multiple shader modules may be bound to a given surface and may be invoked for different shading tasks. Memory 226 also may store geometry shader modules 229, acceleration structure generated by acceleration structure builder 210, texture data 233, varyings 235 (e.g., interpolated parameters), as well as scene geometry (e.g., untesselated and/or tesselated geometry). Memory 226 also may serve to store data for render targets that may recipients of outputs from executing shaders. Cores 219 may primarily be used to execute shading code. However, cores 219 may be implemented as full instruction set architecture programmable processors, which may each operate on a respective vector of data (e.g., in a Single Instruction Multiple Data (SIMD) model). Thus, in an example, cores 219 represent a multi-threaded computation unit, on which can be scheduled multiple independent threads of computation.

FIG. 5 also depicts that elements of an API semantic may assist different constituent portions of the depicted architecture to interoperate. For example, an API semantic 232 may interface executing shaders in shader cores 219 with geometry unit 200; an API semantic 230 may interface executing shaders in shader cores 219 with ray intersection testing unit 212, and API semantic 231 may interface executing shaders in shader cores 219 with acceleration structure builder 210.

Global scheduling and control logic also may execute on shading cores 219 and use API semantics 230-232. For example, API semantic 230 and 232 may be used to obtain information on ray intersection testing status and direct or control tesselator to perform on-demand tesselation of geometry, in coordination with collections of rays being ready to test that tesselated geometry for intersection. FIG. 5, as explained above, can process shaders that are agnostic concerning whether they are invoked responsive to ray tracing or to scan conversion, and can process shaders that are specific to different kinds of approaches. FIG. 5 depicts examples of details and functions that may be included, but are not necessarily included in implementations. For example, tesselation is not a mandatory feature of implementations.

FIG. 5 also depicts that ray intersection testing unit 212 can communicate (depicted as 260) with routines executing on cores 219. This communication may involve a situation where displaced geometry may need to be tested for intersection. For example, intersection testing unit 212 may request that a geometry displacement algorithm be executed on cores 219, for a specific region of a 3-D scene. Such displacement algorithm may involve marching a ray through a defined volume to search for an intersection. In another example, displaced geometry may be stored in memory, and an index or other location information provided to ray intersection testing unit 212.

Figure 6:
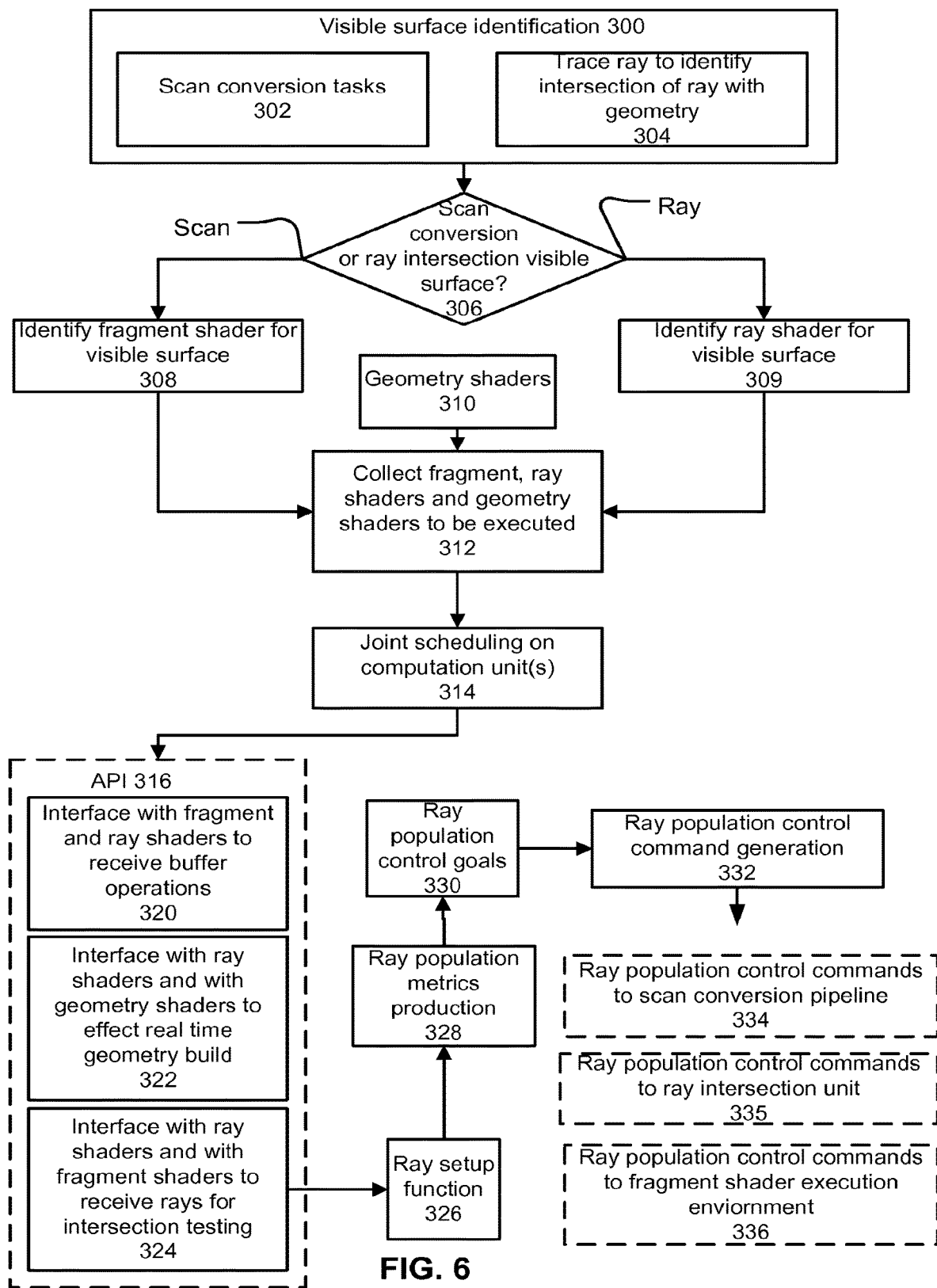
FIG. 6 depicts an aspects of an example process that can be performed on implementations of the architectures of FIG. 1 and FIG. 5.

FIG. 6 depicts an example process in which shaders specific for different kinds of visible surface identification approaches are jointly scheduled and executed on architectures, such as those according to the example of FIG. 5. FIG. 6 depicts a visible surface determination module 300, which comprises facilities for executing scan conversion tasks 302, and for tracing rays 304. A decision 306 can be performed to categorize outputs of visible surface determination 300 as requiring fragment shader or ray shader code to be invoked, and responsively, at 308, a fragment shader is identified, or at 309 a ray shader is identified. At 312, shaders to be invoked are collected, along with other computation to be performed, such as geometry shaders 310. At 314, these collected shaders and other computation are jointly scheduled on the computation unit(s) available for these workloads. Within an API process 316, interface functions can be performed, including interfacing 320 with fragment and ray shaders to receive buffer operations, interfacing with ray shaders and geometry shaders to effect real time geometry building and revision 322, and interfacing 324 with ray shaders and with fragment shaders to receive rays for intersection testing. Acceleration structure building and revision also can be performed, such as within module 322. Such rays can be processed by a ray setup function, which sets up data structures for such rays at 326. FIG. 5 also depicts that ray population statistics production 328 and goal tracking 330 can be performed, resulting in ray population control command generation 332. Such commands can include for example, commands 334 to control scan conversion, to the ray intersection testing unit 335, and to fragment shader execution environment 336. Other commands can be generated for effecting ray population goals in implementations according to the disclosure.

Figure 13:
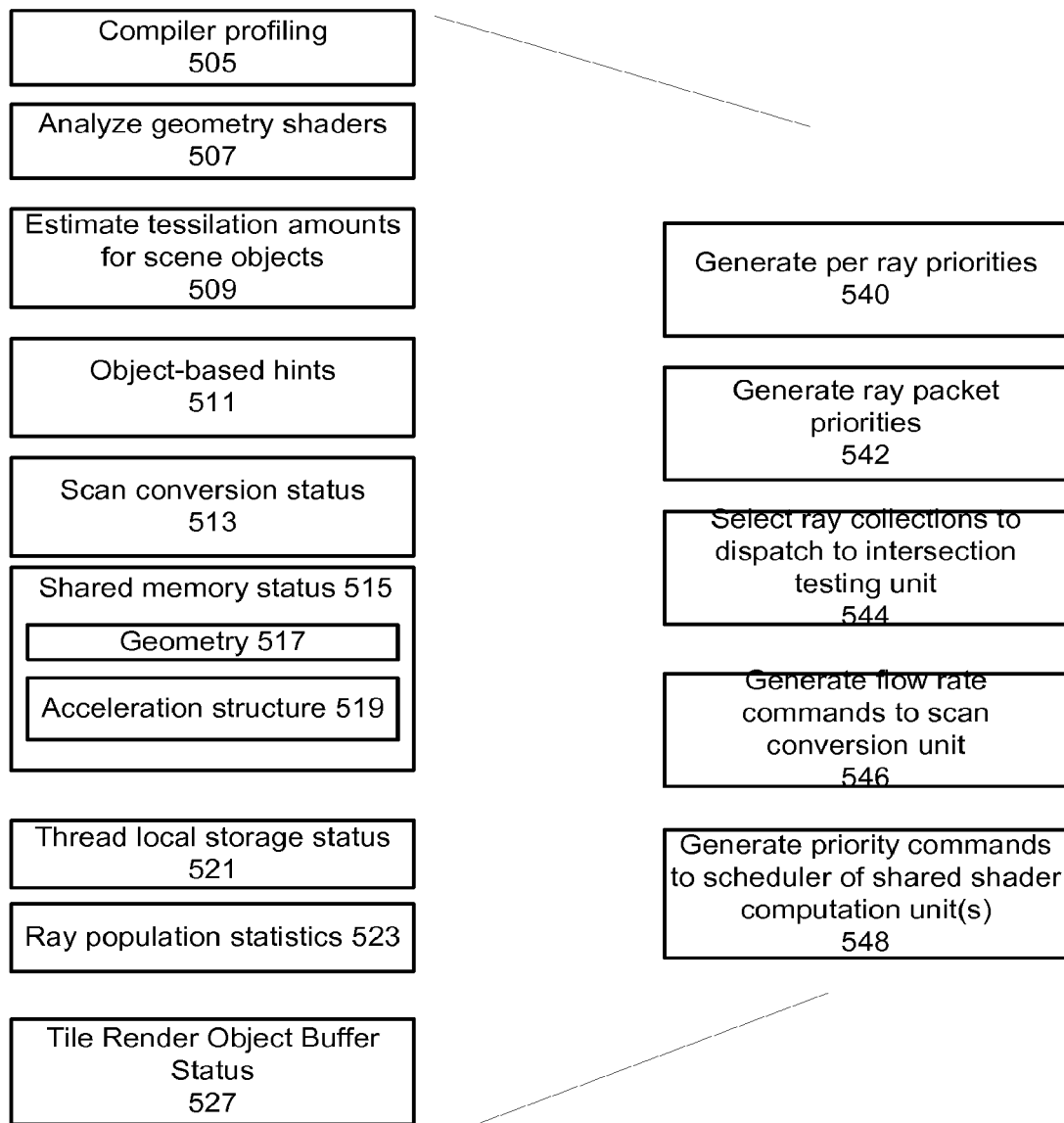
FIG. 13 depicts an example of data that can be input to rendering control processes, such as a ray population control, and how such ray population control can be effected by commands to various components.

FIG. 13 depicts examples of data inputs that can be used in determining system control commands, and examples of system control commands that can be implemented. Example inputs can include compiler profiling inputs 505, results of analyzing geometry shaders 507. For example, an amount of geometry amplification resulting from a given shader may be estimated. Amounts of tesselation for different scene objects may be estimated 509. Such estimation can be based on a specific view position and coordinates of such objects, for example, during transformation of objects from object space coordinates to world coordinates, distance of objects from the viewpoint can be used to estimate tesselation amounts. In some approaches hints 511 concerning computational complexity for the object can be provided. These hints can be provided by a shader associated with an object, for example. A status of scan conversion 513 can be used, such as a relative position or progress of scan conversion in the 3-D scene, or in some situations, status of buffering elements. A shared memory status 515, which can store geometry 517 and acceleration structures 519 can be input; for example, if a shared memory is running low on space, then such input can be used in producing appropriate control commands. Other inputs can include thread local storage status 521, ray population statistics 523, and tile render object buffer status 527.

Commands and other rendering control decisions can include generating per-ray priorities 540, generating ray packet priorities 542, selecting ray collections to dispatch for intersection testing 544, generating flow rate commands to scan conversion 546, and generating priority commands to a scheduler of shared computation units 548.

In more specific detail concerning examples of ray packets and tile-aware rendering control, FIGS. 8-12 depict various examples and aspects relating to such subject matter. FIG. 8 depicts that rays can be tracked according to a region of 3-D space (collectively, regions 450), represented in 3-D coordinate space 452, in which they are to be tested for intersection. Rays can be tracked in multiple disparate regions of 3-D space simultaneously. FIG. 9 depicts that rays also can be tracked with respect to pixels or tiles (460) in screen space that they may contribute to during shading. Tiles and pixels are 2-D screen space concepts. FIG. 9 depicts that each ray can be associated with a tile, by an indicator, such as a bit, such that each ray can have a series of tileID, each of some number of bits. These tileIDs can be used to determine which tiles still have the possibility of being changed, based on rays in flight.

FIG. 10 depicts that a series of ray collections can include a set of ray identifiers. Ray identifiers can be associated with or derived from memory locations in different portions of thread local storage 224. In addition, ray collections also can have information to identify what tiles have rays in each collection. FIG. 11 depicts an example where a ray is defined by definition data that includes information 472 for a tileID and a pixelID. For example, a 16 bit tileID can uniquely identify over 65,000 tiles, and a 24 bit total ID would then allow each tile to have 256 pixels (or other uniquely identified portions, such as pixel fragments). Each tile can have a count of rays that reference a pixel within that tile. Some implementations do not need the tile count to be exact, but rather simply indicative of a relative number of rays pending for different tiles. These reference counts can be used to determine when cache space for a particular tile may be deallocated. FIG. 1 depicts that ray reference counts 95 can be stored with ray definition data, and/or in conjunction with read/update/write cache 84. Ray reference counting also can be accomplished by tracking numbers of rays that are associated with acceleration structure elements, and tracking which acceleration structure elements are within a volume defined by a projection of the tile into the 3-D scene. In one example, reference counts are also maintained for rays with respect to acceleration structure elements. Such reference counting can be implemented by a flag that a number of acceleration structure elements that still have rays associated with them, in an example approach. Ray collector 62 may maintain the ray reference counts in ray definition data 89, and signal when all the rays for a given acceleration structure element have completed (or decrement an associated count), which can be maintained in a register or memory location visible to a circuit maintaining cache 84. Also, these counts can be used to prioritize intersection testing and/or shading of selections of rays.

Rays can be represented by ray data structures that contain an identifier of a pixel to which it will contribute. Some portion of that pixelID may identify the tile. Identifiers also may one or more bits for sequence identification, in order to differentiate rays, pixels and/or tiles that belong to different frames in a sequence of frames. Of course, FIG. 11 is an example, from which implementations can be made by those of ordinary skill.

FIG. 12 depicts an example process where a set of in flight or working tileIDs can be maintained, such that not every tile in an image is given a unique ID. The example process shows, at 474, that rasterization can begin to process a new tile, and at 476 an ID is assigned to the new tile, from a pool of open tile identifiers, and that identifier is then removed from the pool of tile identifiers. At 478, that tile also can be added to a list of tiles in flight. At 484, a shader emits a ray associated with the tile (e.g., a fragment or pixel in the tile); at 480, the ray is tested for intersection. At 486, an association of rays to tile identifiers is maintained (e.g., by adding the emitted ray). At 488, a shader can be activated, responsive to a result of testing the ray for intersection. Since that ray has now completed, at 490, the association of tile identifiers to rays can be updated. At 492, a determination is made whether a given tile has completed rasterization and that all associated rays have been shaded (or otherwise disposed of, in that a shader need not execute for every ray emitted). This determination can be made for each tile in flight. This determination also can be made for a given tile, responsive to a ray completing shading, intersection testing (e.g., if no shader is to be run). If a positive determination results, then at 495, the tile identifier for each tile found to be completed is released, and further rasterization 474 and ray intersection testing 480 can proceed. As explained previously, these processes can proceed concurrently, and ray intersection testing can be performed on groups of rays, where testing of individual rays is deferred, so that scheduling of intersection testing is performed for collections of rays. Implementations may provide for deferring of processing for specific rays differently. In one approach, a different thread of computation may be assigned to process each ray, and so threads that execute the same operation (e.g., traversing an acceleration structure or testing a ray for intersection with a primitive) are scheduled together, while other threads wait for subsequent scheduling period. In another approach, rays are collected into groupings that all are to be tested traversed within a particular portion of an acceleration structure or to be tested for intersection with a particular primitive or group of primitives. The latter approach provides advantages of reduced data traffic (bandwidth consumption) because different threads of computation will have better locality of inputs.

In a specific example of ray intersection testing control, ray intersecting testing unit 335 can be commanded or controlled to prioritize collections that have rays associated with particular tiles. For example, many rendering algorithms may require color data for a particular pixel to be updated a number of times. In order to facilitate rapid reading, and writing of such data, FIG. 1 depicts that a read/update/write cache 84 can be provided. This cache 84 may have space to store data for a maximum number of pixels or tiles, which can be substantially fewer than a total number of tiles or pixels in the entire image being rendered. For a normal rasterzation process, such limited storage would not be of concern, because pixels and tiles naturally complete rendering in a well-defined and predictable sequence. However, in a variety of implementations of the disclosed architectures, pixels and tiles would not complete in a known or readily determinable sequence, because some rays can be delayed in completing processing for a comparatively long time. For example, a pixel can have many small updates produced by specific kinds of features, such as caustics, reflections, refractive effects and so on. However, implementations should not cause a rasterization pipeline to stall or unduly impede throughput of pixel processing. In one approach, ray scheduling receives commands or information for prioritizing collections of rays that include rays associated with tiles that otherwise have completed processing. Such information can include aging information, and a total number of rays required to be processed for a given tile. For example, there may be situations where only a few rays are required to be completed in order to allow a full tile of pixels to be evicted from cache 84, and in such circumstances, ray collections with those rays can receive a relatively high priority for intersection testing, and for shading (which may result in more rays to be processed for that tile, which in turn can be prioritized). In this disclosure, a pipeline can be implemented by a sequence of fixed-function and/or programmable or configurable hardware, Outputs from one operation performed in fixed-function or programmable or configurable hardware can be fed back into that same hardware for a subsequent operation. As such, usage of the term pipeline does not require discrete hardware elements arranged to communicate in a linear fashion, but rather refers to a set of tasks performed to complete an identifiable set of operations.

Figure 14:
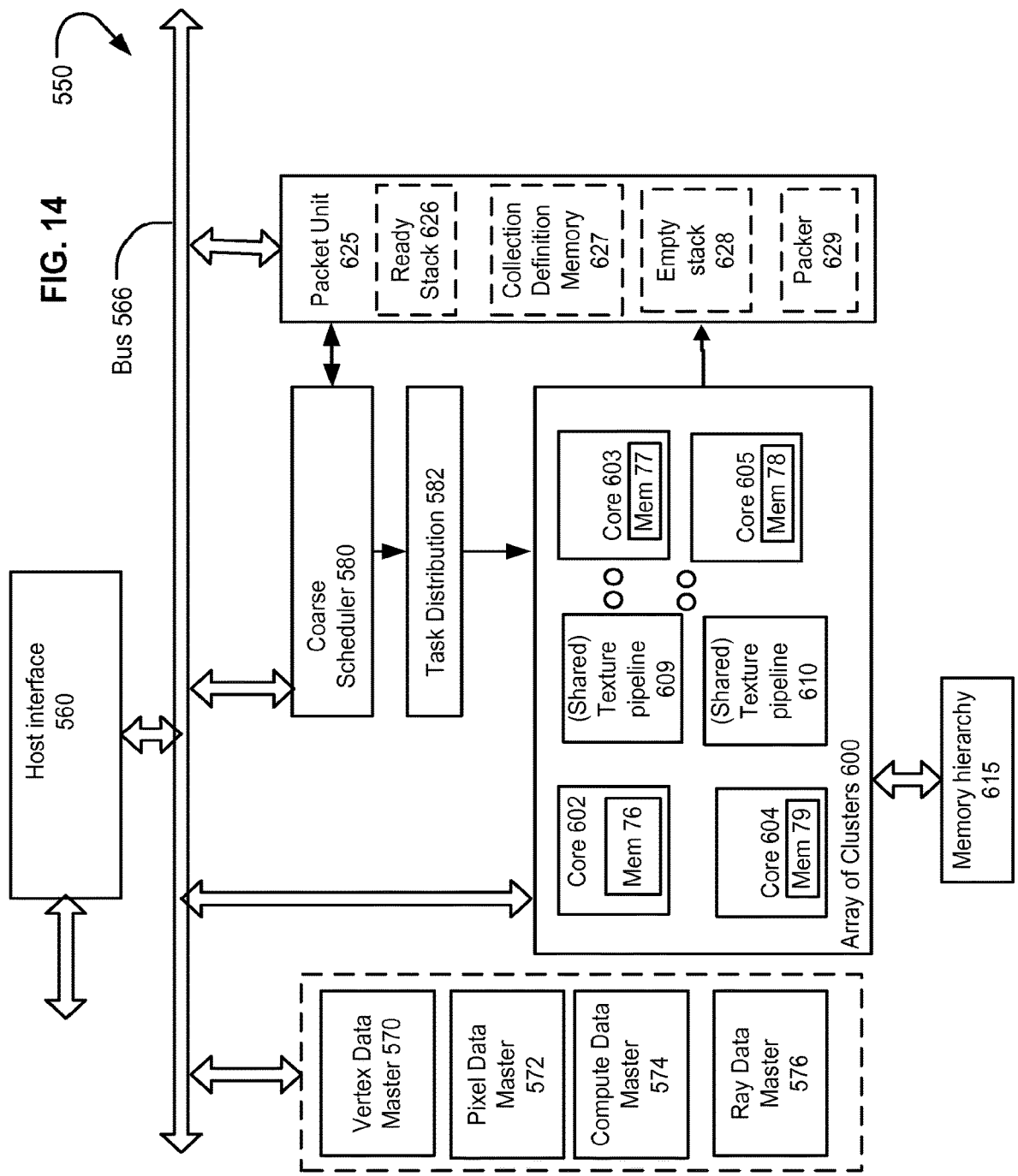
FIG. 14 depicts aspects of example hardware which can be used for implementations.

FIG. 14 depicts aspects of an example of a graphics processor implementation 550, in which architectures according to FIG. 1 and FIG. 5 can be practiced. Implementation 550 includes a set of data masters, including vertex 570, 572, compute 574, and ray 576. These data masters are responsible for setting up respective types of processing to be performed. An array of computation clusters 600 comprises cores 602-605, each of which has a respective local memory 76-79, which collectively implement thread local storage 224. Shared texture pipelines 609 and 610 can be used by the cores 602-605 for shading operations. A coarse scheduler 580 schedules computation on behalf of data masters 570-576 on a cluster-wide basis. A task distributor 582 distributes information for performing allocated computation among the cores 602-605. A packet unit 625 maintains ray collections in a collection definition memory 627. A packer 629 receives intersection testing results and updates collection definitions in memory 627. A ready stack 626 maintains information identifying groupings of rays ready to be dispatched for concurrent testing. An empty stack 628 maintains a list of ray collection positions that can be allocated to form a new collection, as needed. Stack 626 can be implemented virtually by tracking which threads can be executed concurrently, according to a concurrency of execution model being employed in a particular implementation. A memory hierarchy 615 represents a system memory resource, which can comprise one or more layers of cache, and a shared main memory, for example. Such memory hierarchy 615 can be used to implement memory 226 for example. A bus 566 serves to connect the depicted components for communication, and a host interface 560 can communicate to such components through bus 566. For example, a host processor (not depicted) can setup computation to be performed on implementation 550, through host interface 560.

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine. Software implementations also may involve software or firmware configuring one or more hardware elements. Where functions are described, these functions, unless stated otherwise, can be performed by a fixed function hardware element, a hardware element configured by or operating under software control, or a combination thereof. Collectively, the hardware elements (whether fixed function and/or software-controlled can be termed a module or unit for performing the function attributed thereto). A person of ordinary skill may understand a variety of implementations for such a module or unit, based on the disclosures herein. A system comprising an enumeration of such modules or units does not include software per se, although such a system may include elements that are configured with software, or which have software and/or data stored thereon.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a (non-transitory) computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether a given portion of such functionality is implemented as dedicated or fixed function hardware or software configuring one or more hardware elements depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

What is claimed is:

1. Ray tracing logic for use in rendering an image of a 3-D scene in accordance with a 2-D rendering space which is subdivided into a plurality of 2-D tiles, the ray tracing logic comprising ray intersection testing logic configured to perform intersection testing on one or more rays with respect to the 3-D scene;

wherein the ray tracing logic is implemented in hardware and is configured to:
determine an association between each of the one or more rays with a 2-D tile of the 2-D rendering space in response to the one or more rays being emitted;
determine an updated association between rays and tiles comprising updating an association between a ray and a given tile in response to processing of the ray being complete for the given tile;
determine, based on the updated association between rays and tiles, whether processing of all of the one or more rays associated with the given tile has completed; and
in response to determining that the processing of all of the one or more rays associated with the given tile has completed, schedule one or more new rays for processing by the ray tracing logic.

2. The ray tracing logic of claim 1, further comprising ray shading logic configured to execute code modules in response to results of the intersection testing.

3. The ray tracing logic of claim 2, wherein the ray tracing logic is configured to schedule, based on status of which rays will contribute to which tiles, one or both of: (i) rays for intersection testing by the ray intersection logic, and (ii) execution of code modules for rays by the ray shading logic.

4. The ray tracing logic of claim 1, further comprising an acceleration structure builder configured to:
receive the geometry data relating to the 3-D scene; and
use the received geometry data to form an acceleration structure for use in intersection testing, wherein the ray intersection testing logic is configured to traverse the one or more rays through the acceleration structure.

5. The ray tracing logic of claim 4, wherein the ray tracing logic is further configured to:
track numbers of rays that are associated with acceleration structure elements; and
identify acceleration structure elements which are within a volume of the 3-D scene defined by a projection of a 2-D tile into the 3-D scene.

6. The ray tracing logic of claim 5, wherein the ray tracing logic is further configured to use the tracked number of rays and the identification of the acceleration structure elements to prioritize intersection testing and/or shading of rays for processing by the ray tracing logic.

7. The ray tracing logic of claim 1, wherein the ray intersection testing logic is configured to perform intersection testing on collections of rays concurrently, wherein a collection of rays has information to identify tiles which are associated with rays in the collection of rays.

8. The ray tracing logic of claim 7, wherein the ray tracing logic is configured to prioritize collections of rays that have rays associated with particular tiles.

9. The ray tracing logic of claim 8, wherein the ray tracing logic is configured to prioritize collections of rays that include rays associated with tiles that otherwise have completed processing.

10. The ray tracing logic of claim 1, wherein for each tile of the rendering space a count of rays that are associated with that tile is stored.

11. The ray tracing logic of claim 10, wherein the count of rays is increased when a ray associated with the tile is emitted, and wherein the count of rays is decreased when a ray associated with the tile has undergone intersection testing.

12. A rendering unit comprising the ray tracing logic of claim 1.

13. The rendering unit of claim 12, further comprising:
a cache configured to store rendering outputs for tiles of the rendering space; and
a cache controller configured to control the cache based on status of processing of rays associated with tiles.

14. The rendering unit of claim 12, further comprising fragment shading logic configured to execute code modules for the determined primitive fragments, wherein at least one of the code modules defines ray data for one or more rays to be emitted into the scene, wherein the fragment shading logic is configured to execute code modules at the same time as the ray intersection testing logic performing intersection testing.

15. The rendering unit of claim 12, further comprising geometry processing logic configured to perform transformations on geometry data relating to the 3-D scene, for use in determining primitives within the 2-D rendering space.

16. The rendering unit of claim 15, wherein some of the geometry data is tessellated geometry data and the geometry processing logic is configured to perform tessellation on the input geometry data for use in determining the primitives within the 2-D rendering space.

17. The rendering unit of claim 15, further comprising a tiling unit configured to determine associations between the primitives and the tiles of the rendering space to thereby indicate which primitives contribute to which tiles.

18. The rendering unit of claim 17, further comprising rasterization logic configured to apply scan conversion to the primitives for determining a plurality of primitive fragments, wherein the rasterization logic and the ray tracing logic are configured to operate concurrently.

19. A method performed by a processing unit for use in rendering an image of a 3-D scene in accordance with a 2-D rendering space which is subdivided into a plurality of 2-D tiles, the method comprising:
performing intersection testing on one or more rays with respect to the 3-D scene;
determining an association between each of the one or more rays with a 2-D tile of the 2-D rendering space in response to the one or more rays being emitted;
determining an updated association between rays and tiles comprising updating an association between a ray and a given tile in response to processing of the ray being complete for the given tile;
determining, using the updated association between rays and tiles, whether processing of all of the one or more rays associated with the given tile has completed; and
in response to determining that the processing of all of the one or more rays associated with the given tile has completed, scheduling one or more new rays for processing.

20. A non-transitory computer readable storage medium having stored thereon computer readable code in a hardware description language that, when processed, enables fabrication of an apparatus for performing rendering, wherein the apparatus comprises:
ray tracing logic for use in rendering an image of a 3-D scene in accordance with a 2-D rendering space which is subdivided into a plurality of 2-D tiles, the ray tracing logic comprising ray intersection testing logic configured to perform intersection testing on one or more rays with respect to the 3-D scene;
wherein the ray tracing logic is configured to:
determine an association between each of the one or more rays with a 2-D tile of the 2-D rendering space in response to the one or more rays being emitted;
determine an updated association between rays and tiles comprising updating an association between a ray and a given tile in response to processing of the ray being complete;
determine, based on the updated association between rays and tiles, whether processing of all of the one or more rays associated with the given tile has completed; and
in response to determining that the processing of all of the one or more rays associated with the given tile has completed, schedule one or more new rays for processing by the ray tracing logic.

* * * * *